United States Patent [19]

Kapuscinski et al.

[11] Patent Number: 5,094,766
[45] Date of Patent: Mar. 10, 1992

[54] DISPERSANT-ANTIOXIDANT VISCOSITY INDEX IMPROVER

[75] Inventors: Maria M. Kapuscinski, Carmel; Robert T. Biggs, Walden; Theodore E. Nalesnik, Wappingers Falls, all of N.Y.

[73] Assignee: Texaco Inc., White Plains, N.Y.

[21] Appl. No.: 546,975

[22] Filed: Jul. 2, 1990

[51] Int. Cl.$^5$ .......................................... C10M 149/02
[52] U.S. Cl. ........................ 252/51.5 A; 252/51.5 R; 525/331.7; 525/331.8; 525/375
[58] Field of Search ............... 525/331.7, 331.8, 375; 252/51.5 R, 51.5 A Primary Examiner—Prince Willis, Jr.
Assistant Examiner—Ellen McAvoy
Attorney, Agent, or Firm—Robert A. Kulason; James J. O'Loughlin; Vincent A. Mallare

[57] ABSTRACT

Dispersant and antioxidant viscosity index improvers for lubricating oils containing an EPR or EPT polymer onto which has been graft polymerized with vinyl azlactone and thereafter reacted with N-phenyl-p-phenylene diamine.

33 Claims, No Drawings

DISPERSANT-ANTIOXIDANT VISCOSITY INDEX IMPROVER

BACKGROUND OF THE INVENTION

This invention relates to a novel multi-functional lubricant additive which is a dispersant, anti-oxidant and a VI improver additive when employed in a lubricating oil composition.

It is well known to those skilled in the art, that hydrocarbon lubricating oils must be formulated by addition of various additives to improve their properties.

In the case of lubricating oils, typified by those employed in railway, automotive, aircraft, marine etc., service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, etc.

It is, therefore, an object of this invention to provide an additive system which imparts to lubricating oils these improved properties of viscosity index, dispersancy and oxidative stability. Other objects will be apparent to those skilled in the art.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this polymer type of oil additive.

U.S. Pat. No. 3,522,180 discloses a method for the preparation of an ethylene-propylene copolymer substrate effective as a viscosity index improver for lubricating oils.

U.S. Pat. No. 4,089,794 discloses ethylene copolymers derived from ethylene and one of more ($C_3$ to $C_{28}$) alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as a sludge and varnish control additive in lubricating oils.

U.S. Pat. No. 4,137,185 discloses a stabilized imide graft of an ethylene copolymer additive for lubricants.

U.S. Pat. No. 4,146,489 discloses a graft copolymer where the backbone polymer is an oil-soluble ethylene-propylene copolymer or an ethylene-propylene-diene modified terpolymer with a graph monomer of C-vinylpyridine or N-vinylpyrrolidone to provide a dispersant VI improver for lubricating oils.

U.S. Pat. No. 4,320,019 discloses a multipurpose lubricating additive prepared by the reaction of an interpolymer of ethylene and a ($C_3$-$C_8$) alpha-monoolefin with an olefinic carboxylic acid acylating agent to form an acylating reaction intermediate which is then reacted with an amine.

U.S. Pat. No. 4,764,304 discloses a lubricating oil dispersant VI improver composition containing an additive prepared by the reaction of an olefin copolymer and an unsaturated isocyanate to form reactive intermediate which is then reacted with heterocyclic amines.

U.S. Pat. No. 4,340,689 discloses a process for grafting a functional organic group onto an ethylene copolymer or an ethylene-propylene-diene terpolymer.

U.S. Pat. No. 4,357,250 discloses a reaction product of a copolymer and an olefin carboxylic acid via the "ene" reaction followed by a reaction with a monoamine-polyamine mixture.

U.S. Pat. No. 4,382,007 discloses a dispersant—VI improver prepared by reacting a polyamine-derived dispersant with an oxidized ethylene-propylene polymer or an ethylene-propylene diene terpolymer.

U.S. Pat. No. 4,144,181 discloses polymer additives for fuels and lubricants comprising a grafted ethylene copolymer reacted with a polyamine, polyol or hydroxylamine and finally reacted with an alkaryl sulfonic acid.

The disclosures in the forgoing patents which relate to VI improvers and dispersants for lubricating oils, namely U.S. Pat. Nos. 3,522,180, 4,026,809, 4,089,794, 4,137,185, 4,144,181, 4,146,489, 4,320,019, 4,340,689, 4,357,250, and 4,382,007 are incorporated herein by reference.

An object of this invention is to provide a novel derivatized copolymer composition.

Another object is to provide a process for preparing a derivatized copolymer with an alkenyl azlactone to form a modified copolymer which performs as a dispersant in lubricating oil.

Another object is to provide a process for preparing a derivatized copolymer with an alkenyl azlactone to form a reactive intermediate which is then reacted with an antioxidant aromatic amine to yield a modified copolymer which performs as a dispersant or as a dispersant and antioxidant in lubricating oil.

Still another object of this invention is to provide a multi-functional lubricant additive effective for imparting viscosity index and dispersancy or dispersancy and anti-oxidant properties to a lubricating oil composition.

SUMMARY OF THE INVENTION

The present invention is directed to a method of making dispersant or dispersant/antioxidant VI improvers based on a polymer prepared in a one or two-step process which comprises using olefin copolymers as a polymer base derived with alkenyl azlactone or alkenyl azlactone and aromatic amines.

To prepare dispersant VI improver, alkenyl azlactone is grafted onto polymer such as EPM or EPDM in presence of free radical initiator.

Dispersant/antioxidant VI improvers are made in a two-step process. First, alkenyl azlactone is grafted onto polymer under elevated temperatures with addition of a free radical initiator. The grafting reaction is followed by reaction with amine. The following reactions illustrate the process of invention:

1. Grafting reaction

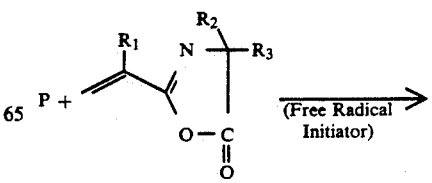

-continued

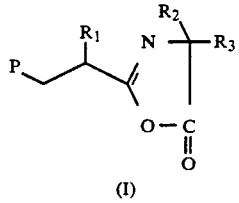

(I)

wherein P is a polymer selected from the group consisting of ethylene propylene copolymer, ethylene propylene diene terpolymer, hydrogenated styrene-butadiene copolymer, styrene isoprene or butadiene copolymer, and hydrogenated isoprene polymer; $R_1$ is a hydrogen or an organic linear, cyclic or heterocyclic, and aromatic or heteroromatic unit composed of hydrocarbon and/or one or more atom of oxygen, nitrogen, sulfur or phosphorus; and $R_2$ and $R_3$ are aromatic or heteroaromatic groups composed of hydrocarbon and/or one or more atoms of oxygen, nitrogen, sulfur or phosphorus.

2. Ring opening reaction

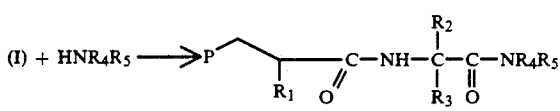

wherein P is a polymer selected from the group consisting of ethylene propylene copolymer, ethylene propylene diene terpolymer, hydrogenated styrene-butadiene copolymer, styrene isoprene copolymer, and hydrogenated polyisoprene; $R_1$, $R_2$ and $R_3$ are as above; $R_4$ is hydrogen or an organic linear, cyclic or heterocyclic, and aromatic or heteroaromatic unit composed of hydrocarbon and/or one or more atom of oxygen, nitrogen, sulfur or phosphorus; $R_5$ is an aromatic or heterocyclic group composed of hydrocarbon and/or one or more atoms of oxygen, nitrogen, sulfur or phosphorus.

The novel reaction product of the invention preferably is prepared using ethylene-propylene copolymer (EPM) or ethylene-propylene diene terpolymer (EPDM) as a polymer base, alkenyl azlactone as a functionalizing agent and N-phenyl-p-phenylene diamine as a hindered aromatic amine.

The lubricant additive of the present invention comprises an oil of lubricating viscosity and an effective amount of the novel reaction product. The lubricating oil will be characterized by having viscosity index improver, dispersancy and oxidant properties. The methods of preparation are also contemplated.

DESCRIPTION OF THE INVENTION

This invention as discussed briefly above, is directed to a polymer comprising an oil-soluble, substantially linear, carbon-carbon backbone polymer bearing dispersant and antioxidant units thereon, derived from a functional monomer containing a azlactone group and an aromatic hindered amine such as N-phenyl-p-phenylene diamine or aromatic amine containing sulfur such as 3(methylmercapto)aniline.

The charge polymer which may be employed in the practice of the present process of this invention may include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from a monomer containing the grouping

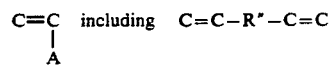

wherein A may be a hydrogen, hydrocarbon such as alkyl, aryl (particularly phenyl) etc.,—OOCR typified by acetate or less preferred acyloxy (typified by—OOCR) halide, etc. R" may be divalent hydrocarbon typified alkylene, alkarylene, cycloalkylene, arylene, etc.

The polymer or copolymer substrate employed in the novel additive of the invention may be prepared from ethylene and propylene or it may be prepared from ethylene and a higher olefin within the range of $C_3$ to $C_{10}$ alpha-monoolefins.

More complex polymer substrates often designated as interpolymers may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4cyclohexadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 5-ethylidene-2-norbornene.

The polymer and copolymers prepared from the above mentioned monomers having short and long branches or star shape structure may also be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40-90 mole %, preferably 55-80 mole %, say 59 mole %, the remainder being derived from propylene.

The molecular weight $\overline{M}_n$ of the EPM copolymers which may be employed may be about 5,000 to about 1,000,000, preferably about 20,000 to about 200,000, and most preferably about 140,000. The molecular weight distribution may be characterized by $\overline{M}_w/\overline{M}_n$ of less than about 15, preferably 1.2-10, say 1.8.

Illustrative EPM copolymers which may be employed in practice of the process of this invention may be those set forth below in Table I, the first listed being preferred.

TABLE I

A. The EPM marketed by Copolymer Rubber and Chemical Corporation containing 59 mole % of units derived from ethylene and 41 mole % of units derived from propylene, having a molecular weight $\overline{M}_w$ of 140,000 and a $\overline{M}_w/\overline{M}_n$ of 1.6.

B. The Epcar 505 brand of ELM marketed by B. F. Goodrich Co., containing 50 mole % of units derived from ethylene and 50 mole % of units derived from propylene, having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5.

When the charge polymer is ethylene-propylene-diene terpolymer (EPT or EPDM), it may be formed by copolymerization of ethylene, propylene, and diene monomers. The diene monomer is commonly a non-conjugated diene typified by dicyclopentadiene; 1,4-hexadiene; ethylidene norbornene or vinyl norbornene. Polymerization is effected under known conditions generally comparable to those employed in preparing the EPM products. The preferred terpolymers contain units derived from ethylene in amount of 40-70 mole %, preferably 50-65 mole %, say 59 mole % and units derived from propylene in an amount of 20-60 mole%, preferably 30-50 mole %, say 41 mole % and units derived from diene third monomer in amount of 0.2-15 mole %, preferably 0.3-3 mole %, say 0.5 mole %. The molecular weight $\overline{M}_n$ of the terpolymers may typically be about 5,000 to about 500,000, preferably about 20,000 to about 200,000, and most preferably about 90,000. Molecular weight distribution of the useful polymers is preferably narrow viz a $\overline{M}_w/\overline{M}_n$ of typically less than 10, preferably 1.5-5, say about 2.2.

Illustrative EPT (EPDM) terpolymers which may be employed in the practice of the present process may be those set forth below in Table II, the first listed being preferred.

TABLE II

A. The sheared Epsyn 4106 brand of EPT marketed by Copolymer Rubber and Chemical Corp., containing 59 mole % of units derived from ethylene, 40.5 mole % of units derived from propylene, and 0.5 mole % of units derived from ethylidene norbornene and having a $\overline{M}_w/\overline{M}_n$ of 2.2 and a molecular weight $\overline{M}_n$ of 80,000.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 derived from dicyclopentadiene and having a $\overline{M}_n$ of 100,000 and a polydispersity index $\overline{M}_w/\overline{M}_n$ of 2.

D. The Royalene brand of EPT marketed by Uniroyal containing 62 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

E. The sheared Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

It is a feature of the process of this invention that the additive is prepared in two-step process. In the first step a functional monomer containing azlactone group is grafted in the presence of a free radical initiator. In the second step, a hindered aromatic amine is reacted with the pendant azlactone groups of the said polymer.

THE GRAFT FUNCTIONAL MONOMER

It is a feature of the process of this invention that the graft functional monomers which may be employed (within a polymeric configuration) may be characterized by the presence of units containing an ethylenically unsaturated carbon-carbon double bond and an azlactone group. Although the graft monomer may contain more than one ethylenically unsaturated carbon-carbon double bond or azlactone group in a preferred embodiment it may contain one of each. Graft monomers containing more than one ethylenically unsaturated carbon-carbon double bond are much less preferred because of the high probability of cross-linking during subsequent reaction.

The graft functional monomer may be characterized by the formula

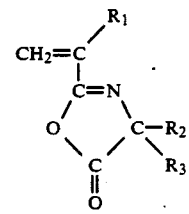

Where $R_1$, $R_2$ and $R_3$ is a hydrogen or an organic linear, cyclic or heterocyclic, and aromatic or heteroatomatic group composed of hydrocarbon which may contain one or more atom of oxygen, nitrogen, sulfur or phosphorus.

Typical $R_1$, $R_2$ and $R_3$ groups are listed in the Table III below:

TABLE III

| ALKENYL AZLACTONES | | |
|---|---|---|
| $R^1$ | $R^2$ | $R^3$ |
| H | H | $i\text{-}C_3H_7$ |
| H | H | $CH_3SCH_2CH_2$ |
| H | $CH_3$ | $CH_3$ |
| H | $CH_3$ | $C_2H_5$ |
| H | $CH_3$ | $n\text{-}C_3H_7$ |
| H | $CH_3$ | $n\text{-}C_9H_{19}$ |
| H | $CH_3$ | $C_6H_5$ |
| H | $CH_3$ | $C_6H_5CH_2$ |
| H | $-(CH_2-)_4{}^e$ | |
| H | $-(CH_2-)_5{}^e$ | |
| H | $-CH_2CH_2OCH_2CH_2-{}^e$ | |
| $CH_3$ | H | H |
| $CH_3$ | H | $CH_3$ |
| $CH_3$ | H | $i\text{-}C_3H_7$ |
| $CH_3$ | H | $i\text{-}C_4H_9$ |
| $CH_3$ | H | $C_6H_5CH_2$ |
| $CH_3$ | $CH_3$ | $CH_3$ |
| $CH_3$ | $CH_3$ | $C_2H_5$ |
| $CH_3$ | $CH_3$ | $n\text{-}C_3H_7$ |
| $CH_3$ | $CH_3$ | $i\text{-}C_4H_9$ |
| $CH_3$ | $C_2H_5$ | $C_2H_5$ |
| $CH_3$ | $-(CH_2)-_4{}^e$ | |
| $CH_3$ | $-(CH_2)-_5{}^e$ | |
| $CH_3$ | $-(CH_2)-_{11}{}^e$ | |
| $CH_3$ | $-(CH_2)-_4CH(C_3H_7){}^e$ | |
| $CH_3$ | $CH_3C=O$ | $CH_3$ |
| $CH_3$ | $CH_3C=O$ | $i\text{-}C_4H_9$ |

TABLE III-continued

| | ALKENYL AZLACTONES | |
|---|---|---|
| $R^1$ | $R^2$ | $R^3$ |
| $CH_3$ | $CH_3C=O$ | $C_6H_5CH_2$ |
| $n\text{-}C_4H_9$ | H | $i\text{-}C_3H_7$ |

It is a feature of the process of this invention that the graft functional monomer may be grafted onto carbon-carbon backbone polymers.

THE GRAFTING REACTION

In the practice of the process of this invention, 100 parts of charge EPM or EPT may be added to 100–1000 parts, say 305–60 parts of diluent-solvent. Typical diluent-solvent may be a hydrocarbon solvent such as mineral oil, n-hexane, n-heptane, or tetrahydrofuran. Preferred solvent may be a commercial hexane containing principally hexane isomers or a commercial mineral grafting oil. Reaction mixture may then be heated under nitrogen to reaction conditions of 60° C.–180° C., preferably 150° C.–170° C., say 155° C. When n-hexane or other low boiling solvent is used, reaction is carried out in pressure reactor at 15–300 psig, preferably 180–220 psig, say 200 psig.

Graft monomer, typically vinyl azlactone is admitted in amount of 1–40 parts, say 5 parts, as a solution in 0–20 parts, say 5 parts of diluent-solvent. There is also added a solution in diluent-solvent of free radical initiator. Typical free radical initiators, (graft polymerization catalysts) may include dicumyl peroxide, di-t-butyl peroxide, benzoyl peroxide, di-isopropyl peroxide, azobisisobutyro-nitrile, etc. The solvent is preferably the same as that in which the EPM or EPT is dissolved. The initiator may be added in amount of 0.2–40 parts, say 2 part in 0.8–120 parts, say 2 parts. The preferred free radical initiator is a dicumyl peroxide (DICUP).

The reaction is carried out at a temperature at least as high as the decomposition temperature of the initiator, typically 150°–160° C. or higher.

The grafting reaction is typically carried out at graft polymerization conditions of 60° C.–180° C., say 155° C. during which time bonding of the graft functional monomer onto the base EPM or EPT polymer occurs.

Typically the reaction may proceed as follows:

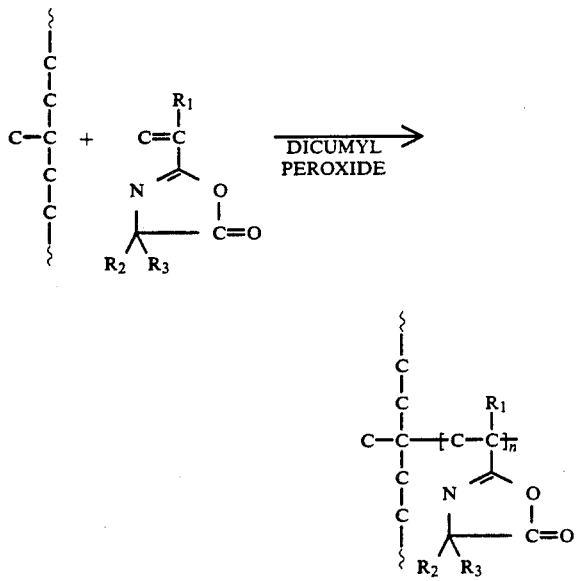

The product graft polymer may be characterized by the presence of pendant azlactone groups bonded to the polymer backbone through the residue of the graft monomer, the latter being bonded to the polymer backbone through one of the carbon atoms which formed the ethylenically unsaturated double bond.

Typically the graft product polymer may by contain 0.1–20, say 0.4 units derived from graft monomer per 1000 carbon atoms of the charge backbone polymer.

THE AMINE REACTANT

In practice of the present process, the graft polymer bearing pendant azlactone groups may be reacted with an aromatic amine containing at least one non-tertiary nitrogen atom. The amine may be characterized by the formula $R_4 R_5 NH$. In this formula $R_4$ represents hydrogen or an organic radical having from 1 to 10 carbon atoms which may contain nitrogen, oxygen or sulfur atoms. $R_5$ is an aromatic or heteroaromatic and/or one or more atoms of oxygen, nitrogen, sulfur or phosphorus.

The amines which may be employed in this inventions are aromatic amines such as N-phenyl-p-phenylene diamine or 3-(methyl mercapto) aniline. It is preferred that the amine be a N-phenyl-p-phenylenediamine.

THE AMIDIZATION REACTION

Amidization may be carried out by adding the graft polymer containing azlactone groups to a reaction vessel together with inert-diluent solvent. In the preferred embodiment, reaction may be carried out in the same solvent and in the same reaction medium as that in which the polymer is dissolved.

Typically, the reaction may proceed as follows:

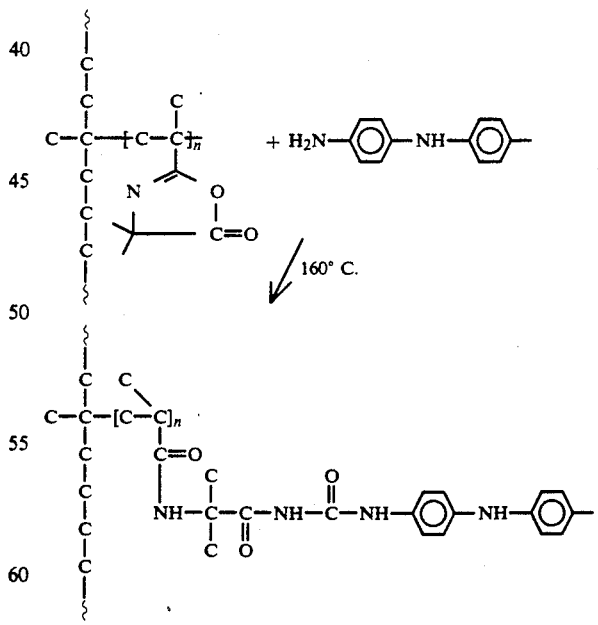

An amine, typically N-phenyl-p-phenylene diamine is added to the reaction vessel. The amount of amine added is preferably 0.1–5 moles, say 1.2 moles per mole of azlactone group bonded to the polymer. Typically this may correspond to 0.01–0.5 moles, say 0.039 moles of amine per 100 g of polymer.

The amidization reaction is carried out over 0.1-20 hours, say 2 hours at 60° C.-180° C., say 155° C. with agitation. For ease of handling, the final product may be diluted to form a solution of 4-20 parts, say 13 parts of polymer in 80-95, say 87 parts of mineral oil such as a SUS 100 oil typified by SNO-100. When the product has been prepared in a low-boiling solvent such as hexane, the latter has to be distilled off.

The fluid solution (a lubricating additive) is used for further testing.

It is a feature of this invention that the so-prepared polymer solution in oil may find use in lubricating oils as multifunctional additive (e.g. dispersant viscosity index improvers which provide anti-oxidant properties, etc) when present in effective amount of about 1.0 to about 20 wt%, preferably 3-15 wt%, preferably about 9 wt%.

Lubricating oils in which the multifunctional additives of this invention may find use may include automotive, aircraft, marine, railway, etc., oils; oils used in spark ignition or compression ignition; summer or winter oils, etc. Typically the lubricating oils may be characterized by a b.p. of about 570° F. to about 660° F., preferably 610° F.; an e.p. of about 750° F. to about 1200° F., preferably 1020° F.; an API gravity of about 25 to about 31, preferably about 29.

A typical lubricating oil in which the polymer of this invention may be present may be a standard SAE 5W-30 hydrocarbon motor oil formulation having the composition as set forth below in Table IV:

TABLE IV

| | Wt % |
|---|---|
| Base oil | 82 |
| Viscosity Index Improver (additive of this invention) (10 w % ethylene-propylene copolymer in 90% inert oil) | 9 |
| Standard Additive Package: Polyisobutenyl (M1290)$_n$ succinimide (dispersant); calcium sulfonate (detergent); Zinc dithiophosphate (anti-wear); di-nonyl diphenyl amine (anti-oxidant); 4,4'-methylene-bis (2,6-di-t-butyl phenol) (antioxidant) | 9 |

Use of the additive of this invention makes it possible to readily increase the viscosity index by 25-40 units, say 35 units and to obtain improved ratings on the tests measuring the dispersancy of the system. The viscosity index is determined by ASTM Test D-445.

The present invention comprises making dispersant and antioxidant VI improvers by derivatizing hydrocarbon polymers such as ethylene-propylene copolymer (EPM), or ethylene-propylene-diene terpolymer (EPDM) with, e.g., vinyl azlactone and a hindered aromatic amine such as N-phenyl-p-phenylene diamine.

Addition of the above invention additives, to a lubricating oil, may be facilitated by use of a concentrate containing about I to about 20 wt.%, preferably about 4 to about 14 wt% of polymer.

The tests and analysis used, according to the present invention, are provided below.

TESTS AND ANALYSIS

1. Oxidation Stability—The antioxidant activity of the new antioxidant and dispersant VI improver was examined by a proprietary test called Bench Oxidation Test (BOT). In this test, the polymer solution is diluted with SNO-130 oil. The mixture is heated with stirring and air agitation. Samples are withdrawn periodically for analysis, by differential infrared analysis (DIR), to observe changes in the intensity of the carbonyl vibration band at $C^{-1}$. Higher carbonyl group intensity indicates a lower thermal oxidative stability of the sample. The result reported, as oxidation index, indicates the change in the intensity of the carbonyl vibration band at $C^{-1}$ after 144 hours of oxidation. A lower rating indicates better thermal oxidative stability of the mixture.

2. Dispersancy—The sample is blended into a formulated oil, not containing a dispersant, to form 1.5 wt.% polymer solution. That blend is tested for dispersancy in the Bench VC Test. In this test, the turbidity of an oil containing an additive is measured after heating the test oil to which has been added a standard blow-by. The result correlates with dispersancy and is compared to three standards (Good, Satisfactory, and Poor) tested simultaneously with the test sample. The numerical rating decreases with an increase in dispersant effectiveness. Results above 90 indicate that the additive does not provide dispersant activity.

Amount of azlactone and aromatic amine incorporated onto OCP in the two-step process is determined by IR-analysis of isolated rubber. The azlactone grafted level was examined based on an N-H amide stretch at 1820 cm$-1$ and a carbonyl stretch at 1670 cm$-1$. The aromatic amine capping reaction yield is determined by aromatic stretch at 1600 cm$-1$. The rubber is isolated from solution by multiple precipitation using cyclohexane as a solvent and acetone as precipitator. The rubber (isolated as a solid) is dried in vacuum at 60° C. for 36 hours.

DESCRIPTION OF THE PREFERRED EMBODIMENTS

The practice of the process of this invention will be more apparent to those skilled in the art from the following examples wherein, as elsewhere in this specification, all parts are parts by weight unless otherwise set forth. Control examples are designated by an asterisk.

EXAMPLE 1

In this example an OCP (Olefin copolymer) is modified by grafting vinyl azlactone and capping N-phenyl-p-phenylenediamine (NPPDA).

The (VDM) (vinyl diene monomer) which is a vinyl azlactone (2-vinyl-4,4-dimethyl-2-oxazoline-5-one) is grafted onto EPM containing around 0.3 mole% of ethylidene norbornene (extruded EPsyn 4106) in presence of free radical initiator, dicumyl peroxide. EPM (Mn=80,000 as measured by SEC) containing approximately 59 mol% of ethylene is used.

100 wt parts of EPM dissolved in 40 parts of mineral grafting oil (SN-130) is heated to 155° C. (with stirring under nitrogen). The mixture is stirred using the above conditions for 2 hours.

7.76 wt parts of NPPDA dissolved in 11 ml Surfonic N-40 is added and the mixture is stirred at room temperature for 2 hours.

Then, the solvent neutral oil (SNO-100) is added to give a solution containing 13.0 wt% polymer. This solution is used for further testing.

EXAMPLE 2

In this example vinyl azlactone (VDM) is grafted onto OCP to prepare dispersant VI improver.

The vinyl azlactone is grafted onto EPM containing around 0.3 mole% of ethylidene norbornene (extruded EPsyn 4106) in presence of free radical initiator, dicumyl peroxide. EPM (Mn=80,000 as measured by SEC) containing approximately 60 mole% of ethylene is used.

100 w. parts of EPM dissolved in 400 parts of mineral grafting oil (SN-130) is heated to 155° C. (with stirring under nitrogen). 6.0 w. parts of VDM is added followed by 2.1 wt. parts dicumyl peroxide dissolved in 15 wt. parts of oil. The mixture is stirred using above conditions for 2 hours.

Then, the solvent neutral oil (SNO-100) is added to give a solution containing 13.0 wt% polymer. This solution is used for further testing.

Example 3

In this example, the procedure of the example 1 is followed except ath 5.85 of 3-(methyl-mercapto)aniline instead of NPPDA is charged.

EXAMPLE 4*

In this example, 13.0 wt% EPM solution in mineral oil is prepared. 100 wt parts of EPM which is used in the example 1, is added to 400 wt parts of SN-130 and 300 wt parts of SNO-100. The mixture is heated to 155° C. with stirring and under nitrogen for 3 hours until the rubber is completely dissolved.

RESULTS

The evaluation data for the samples of Examples 1, 2, 3 and 4* are listed in Table V. The sample numbers are related to the example numbers.

As seen in the Table V, a sample of Example 2 containing polymer grafted with vinyl azlactone show good bench dispersancy performance while sample of Examples 1 and 3 containing polymer grafted with vinyl azlactone and capped with N-phenyl-p-phenylene diamine or 3-(methylmercapto)aniline show good dispersant and antioxidant activities.

The reference sample of Example 4* containing unmodified rubber show neither dispersant activity nor antioxidant stability.

TABLE V

| PROPERTIES OF VI IMPROVERS | | | | |
|---|---|---|---|---|
| SAMPLE | 1 | 2 | 3 | 4* |
| MATERIAL WT PARTS | | | | |
| ELM | 100 | 100 | 100 | 100 |
| VDM | 6 | 6 | 6 | — |
| NPPDA | 7.76 | — | — | — |
| 3-(Methyl-mercapto)aniline | — | — | 5.85 | — |
| DICUP | 2.1 | 2.1 | 2.1 | — |
| Grafting Oil | 331.8 | 331.8 | 331.8 | 331.8 |
| Diluent Oil | 323.4 | 329.4 | 325.4 | 337.4 |
| OXIDATION INDEX (1) | 11 | 1.0 | 7.2 | 24 |
| BENCH DISPERSANCY (2) RESULTS | 42 GOOD | 69 SATISFACTORY | 54 | 92 POOR |

(1) Change in the intensity of the carbonyl group IR vibration at 1710 cm$^{-1}$ after 144 hours in Bench Oxidation Test.
(2) As measured by Bench VC Test

We claim:

1. A method of prepared a substantially linear polymer composition containing a carbon-carbon backbone which comprises: forming a reaction mixture containing a substantially linear, carbon-carbon backbone polymer; graft polymerizing onto said substantially linear carbon-carbon backbone polymer, under graft polymerization reaction conditions of 80° to 180° C. in the presence of a free radical initiator, graft monomer containing a ethylenically unsaturated carbon-carbon double bond and a azlactone group thereby forming a graft polymer bearing a pendant azlactone group reacting said graft polymer bearing a pendant azlactone group where said azlactone is present in the amount of 1 to 40 parts per 100 parts of said polymer with 0.1 to 5 moles of an aromatic amine per mole of said azlactone, said amine containing a non-tertiary amino nitrogen atom thereby forming a pendant amido-amine group on said polymer.

2. A method of preparing a substantially linear polymer composition containing a carbon-carbon backbone as claimed in claim 1 wherein said backbone polymer is a copolymer of ethylene-propylene or a terpolymer of ethylene-propylene-diene.

3. A method of preparing a substantially linear polymer composition as claimed in claim 1 where said aromatic amine is a hindered aromatic amine.

4. A method of preparing a substantially linear polymer composition as claimed in claim 1 wherein said aromatic amine is N-phenyl-p-phenylene diamine.

5. A method of preparing a substantially linear polymer composition as claimed in claim 1 wherein said aromatic amine contains one or more atoms of sulfur.

6. A method of preparing a substantially linear composition as claimed in claim 1 where said aromatic amine is 3-(methylmercapto)aniline.

7. A method of preparing a polymer composition as claimed in claim 1 where said alkenyl azlactone is 1-vinyl-4,4-dimethyl-2-oxazoline-5-one and said amine is N-phenyl-p-phenylenediamine.

8. A method as claimed in claim 1 where said grafting reaction is performed in a polymer solution at 80° to 180° C. in the presence of a free radical initiator which is added in the amount of 0.2 to 40 parts per 100 parts of said polymer.

9. A substantially linear graft polymer containing a carbon-carbon backbone which comprises a substantially linear carbon-carbon backbone polymer and graft polymerized thereon, under graft polymerization reaction conditions in the presence of free radical initial graft monomer containing an ethylenically unsaturated carbon-carbon double bond and an azlactone group which has been reacted with an aromatic amine containing a non-tertiary amino nitrogen atom.

10. A method of preparing a substantially linear polymer composition containing a carbon-carbon backbone which comprises: forming a reaction mixture containing, as backbone polymer, a copolymer of ethylene-propylene or a terpolymer of ethylene-propylene-diene; graft polymerizing onto said backbone polymer, under graft polymerization reaction conditions of 80° to 180° C. in the presence of a free radical initiator a great monomer alkenyl azlactone thereby forming a graft polymer bearing a pendant azlactone group.

11. A method of preparing a substantially linear polymer composition as claimed in claims 1 or 10 where said alkenyl azlactone is 2-vinyl-4,4-dimethyl-2-oxazoline-5-one.

12. A method of preparing a substantially linear polymer composition containing a carbon-carbon backbone which comprises: forming a reaction mixture containing, as backbone polymer, a copolymer of ethylene-propylene or a terpolymer of ethylene-propylene-diene; graft polymerizating onto said backbone polymer, under graft polymerization reaction conditions of 80° to 180° C. in the presence of a free radical initiator graft monomer containing an ethylenically unsaturated carbon-carbon double bond and an azlactone group where said azlactone is present in the amount of 1 to 40 parts per 100 parts of said monomer which azlactone has been reacted with an aromatic amine containing a non-tertiary amino nitrogen atom where 0.1 to 5 moles of said amine was reacted per mole of said azlactone.

13. A substantially linear graft polymer containing a carbon-carbon backbone as claimed in claim 12 wherein said backbone polymer is a copolymer of ethylene-propylene or an ethylene-propylene-diene terpolymer.

14. A substantially linear graft polymer containing a carbon-carbon backbone as claimed in claim 12 wherein said graft monomer contains the grouping

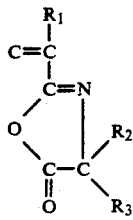

wherein $R_1$, $R_2$ and $R_3$ are hydrogen or an organic linear, cyclic or heterocyclic, and aromatic or heteroaromatic group composed of hydrocarbon which may contain one or more atom of oxygen, nitrogen and sulfur or phosphorous.

15. A substantially linear graft polymer containing a carbon-carbon backbone as claimed in claim 12 wherein said graft monomer is 2-vinyl -4,4- dimethyl-2-oxazoline-5-one.

16. A substantially linear graft polymer containing a carbon-carbon backbone as claimed in claim 12 wherein said amine is an aromatic hindered amine.

17. The substantially linear graft polymer containing a carbon-carbon backbone as claimed in claim 12 wherein said amine is N-phenyl-p-phenylenediamine.

18. A substantially linear graft polymer containing a carbon-carbon backbone as claimed in claim 12 wherein said amine is an 3-(methylmercapto)-aniline.

19. A graft polymer as claimed in claim 12 wherein said azlactone is 2-vinyl-4,4-dimethyl-2-orazoline-5-one and said amine is N-phenyl-p-phenylenediamine.

20. A substantially linear graft polymer containing a carbon-carbon backbone which comprises a substantially linear carbon backbone polymer and graft polymerized thereon, under graft polymerization reaction conditions of 80° to 180° C. in the presence of a free radical initiator graft monomer containing an ethylenically unsaturated carbon-carbon double bond and an azlactone group where said azlactone is present in the amount of 1 to 40 parts per 100 parts of said monomer.

21. A substantially linear graft polymer containing a carbon carbon backbone as claimed in claim 20 wherein said backbone polymer is a copolymer of ethylene-propylene or an ethylene-propylene on an ethylene-propylene-diene terpolymer.

22. A substantially linear graft polymer containing a carbon carbon backbone as claimed in claim 20 wherein said graft monomer is 2-vinyl-4,4-dimethyl-2-oxa-oline-5-one.

23. A lubricating oil additive comprising a major portion of lubricating oil and a minor effective viscosity index improving portion of a substantially linear graft polymer containing a substantially linear carbon-carbon backbone polymer and a graft polymerized thereon, under graft polymerization reaction conditions of 80°0 to 180° C. in the presence of a free radical initiator, graft monomer containing an ethylenically unsaturated carbon-carbon double bond and an azlactone group after graft polymerization has been effected where said azlactone is present in the amount of 1 to 40 parts per 100 parts of said monomer, having been reacted with an aromatic amine containing a non-tertiary amino nitrogen atom where 0.1 to 5 moles of said amine was reacted per mole of said azlactone.

24. A lubricating oil additive as claimed in claim 23 which is used in motor oil to improve its viscosity index, dispersant and oxidation stability properties.

25. A lubricating oil additive as claimed in claim 23 wherein said amine is an aromatic hindered amine such as N-phenyl-p-phenylene-diamine.

26. A lubricating oil additive claimed in claim 23 wherein said amine is an aromatic amine containing or or more atoms of sulfur such as 3-(methylmercapto)-aniline.

27. A lubricating oil additive as claimed in claim 23 wherein said azlactone is 2-vinyl-4.-dimethyl-2-oxazoline-5-one and said amine is N-phenyl-p-phenylenediamine.

28. A lubricating oil additive comprising a major portion of lubricating oil and a minor effective viscosity index improving portion of a substantially linear graft polymer containing a substantially linear carbon-carbon backbone polymer and graft polymerized thereon, under graft polymerization reaction conditions of 80° to 180° C. in the presence of a free radical initiator, graft monomer containing an ethylenically unsaturated carbon-carbon double bond and an azlactone group where said azlactone is present in the amount of 1 to 40 parts per 100 parts of said monomer.

29. The lubricating oil additive as claimed in claims 23 or 28 wherein said backbone polymer is a copolymer of ethylene-propylene or a terpolymer of ethylene-propylene-diene.

30. A lubricating oil additive as claimed in claim 28 which is used in motor oils to improve its viscosity index and dispersant properties.

31. A lubricating oil additive as claimed in claim 23 or 28 wherein said minor effective viscosity index improving portion of said graft polymer is 1-20 wt% based on oil composition.

32. A lubricating oil additive as claimed in claims 23 or 28, which are applied as an additive the motor oils to improve its viscosity index, dispersant and/or dispersant and antioxidant performance.

33. A lubricating motor oil containing 1-20 wt.% of a lubricating oil additive as claimed in claims 23 or 28.

* * * * *